(12) United States Patent
Bessho et al.

(10) Patent No.: US 10,589,448 B2
(45) Date of Patent: Mar. 17, 2020

(54) INJECTION MOLDING METHOD AND INJECTION MOLDING DEVICE FOR TRANSPARENT RESIN MOLDED ARTICLE

(71) Applicant: MITSUBISHI HEAVY INDUSTRIES, LTD., Tokyo (JP)

(72) Inventors: Masahiro Bessho, Tokyo (JP); Naomoto Ishikawa, Tokyo (JP); Tsunetoshi Tanemura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 565 days.

(21) Appl. No.: 14/392,280

(22) PCT Filed: Aug. 20, 2014

(86) PCT No.: PCT/JP2014/071698
§ 371 (c)(1),
(2) Date: Dec. 24, 2015

(87) PCT Pub. No.: WO2015/045677
PCT Pub. Date: Apr. 2, 2015

(65) Prior Publication Data
US 2016/0263797 A1     Sep. 15, 2016

(30) Foreign Application Priority Data
Sep. 30, 2013   (JP) .................... 2013-204665

(51) Int. Cl.
*B29C 45/00* (2006.01)
*B29C 45/14* (2006.01)
(Continued)

(52) U.S. Cl.
CPC .... *B29C 45/14811* (2013.01); *B29C 45/0025* (2013.01); *B29C 45/0046* (2013.01);
(Continued)

(58) Field of Classification Search
None
See application file for complete search history.

(56) References Cited

U.S. PATENT DOCUMENTS 4,277,435 A * 7/1981 Allen .................. B29C 45/2708
264/328.12
5,468,141 A * 11/1995 Iwami ................. B29C 33/3828
249/114.1
(Continued)

FOREIGN PATENT DOCUMENTS

JP    59-95125    6/1984
JP    62-180511   11/1987
(Continued)

OTHER PUBLICATIONS

International Search Report dated Dec. 9, 2014 in corresponding International Application No. PCT/JP2014/071698.
(Continued)

*Primary Examiner* — Monica A Huson
*Assistant Examiner* — Kelsey C Grace
(74) *Attorney, Agent, or Firm* — Wenderoth, Lind & Ponack, L.L.P.

(57) ABSTRACT

The present invention effects a reduction in production cost and increases yield of a transparent resin molded article and prevents the generation of defects such as bubbles, weld lines, and sink marks. This injection molding device (2A) for a transparent resin molded article is equipped with: a die (3) for injection molding the transparent resin molded article; and a gate (5) that is provided to the peripheral edge of the die (3) and that is the inlet through which a resin material (R) is injected into the die (3). The thickness dimensions (Ta) of the die (3) are in the range of 15-25 mm, and the ratio of the diameter dimensions (D) of the gate (5) to the thickness dimensions (Ta) of the die (3) is set in the range of 1:6 to 1:3.

3 Claims, 12 Drawing Sheets

(51) Int. Cl.
*B29C 45/16* (2006.01)
*B29C 45/26* (2006.01)
*B29K 33/00* (2006.01)
*B29K 69/00* (2006.01)
*B29L 9/00* (2006.01)
*B29L 31/30* (2006.01)

(52) U.S. Cl.
CPC .............. *B29C 45/16* (2013.01); *B29C 45/26* (2013.01); *B29C 2045/0027* (2013.01); *B29K 2033/08* (2013.01); *B29K 2069/00* (2013.01); *B29K 2995/0026* (2013.01); *B29L 2009/00* (2013.01); *B29L 2031/3079* (2013.01)

(56) References Cited

U.S. PATENT DOCUMENTS

| | | | | |
|---|---|---|---|---|
| 6,015,514 | A * | 1/2000 | Koseko | B29C 45/0025 264/2.2 |
| 6,475,410 | B1 * | 11/2002 | Nakagawa | B29C 33/3842 264/2.2 |
| 6,796,528 | B2 | 9/2004 | Wood et al. | |
| 7,473,385 | B2 * | 1/2009 | Stiesdal | B29C 70/443 264/314 |
| 7,914,273 | B2 * | 3/2011 | Naito | B29D 11/00413 425/190 |
| 2004/0159745 | A1 | 8/2004 | Wood et al. | |
| 2006/0054743 | A1 | 3/2006 | Wood et al. | |
| 2009/0250845 | A1 | 10/2009 | Suzuki | |

FOREIGN PATENT DOCUMENTS

| | | |
|---|---|---|
| JP | 64-50929 | 3/1989 |
| JP | 7-24868 | 1/1995 |
| JP | 7-148765 | 6/1995 |
| JP | 10-29228 | 2/1998 |
| JP | 11-28745 | 2/1999 |
| JP | 11-198184 | 7/1999 |
| JP | 2000-6203 | 1/2000 |
| JP | 2000-94474 | 4/2000 |
| JP | 2000-355624 | 12/2000 |
| JP | 2001-30287 | 2/2001 |
| JP | 2002-321256 | 11/2002 |
| JP | 2004-243590 | 9/2004 |
| JP | 2004-359221 | 12/2004 |
| JP | 2006-159806 | 6/2006 |
| JP | 2007-38535 | 2/2007 |
| JP | 2007-283715 | 11/2007 |
| JP | 2008-238653 | 10/2008 |
| JP | 4169298 | 10/2008 |
| JP | 2010-137539 | 6/2010 |
| JP | 2010-274568 | 12/2010 |
| JP | 2013-146890 | 8/2013 |
| WO | 01/15883 | 3/2001 |

OTHER PUBLICATIONS

Written Opinion of the International Searching Authority dated Dec. 9, 2014 in corresponding International Application No. PCT/JP2014/071698.

Office Action dated May 9, 2017 in corresponding Japanese Application No. 2016-127562, with Machine Translation.

Office Action dated Jun. 13, 2017 in Japanese Application No. 2013-204665, with Machine Translation.

* cited by examiner

DIRECTION OF FLOW OF RESIN MATERIAL

DIRECTION OF FLOW OF RESIN MATERIAL

INJECTION MOLDING METHOD AND INJECTION MOLDING DEVICE FOR TRANSPARENT RESIN MOLDED ARTICLE

TECHNICAL FIELD

The present invention relates to an injection molding device and an injection molding method for a transparent resin molded article.

BACKGROUND ART

As an injection molding method for a transparent resin molded article, methods disclosed in PTLs 1 and 2 described below are known.

A method of manufacturing a transparent resin member disclosed in PTL 1 is to mold a canopy 1 in which acrylic resin is laminated on both surfaces of an intermediate molded article 2 made of polycarbonate, by disposing the intermediate molded article 2 made of polycarbonate and having a convex shape in the interior of a die 6 composed of a lower mold 60 and an upper mold 61 respectively having cavity surfaces 60a and 61a having the same shape as the external appearance shape of the intermediate molded article 2, clamping the die 6, and pouring transparent acrylic resin into voids between the intermediate molded article 2 and the cavity surfaces 60a and 61a, as shown in FIGS. 2 to 4 of this literature.

Further, a method of manufacturing a contact lens material disclosed in PTL 2 is to obtain an intended contact lens material by injection-molding a first resin mold and a second resin mold for manufacturing a contact lens material, feeding a contact lens material molding material to either of the molded first and second resin molds, forming a contact lens molding cavity by die-matching the first resin mold and the second resin mold, and molding a molding material filled into the cavity, as shown in FIGS. 8 and 9 of this literature.

CITATION LIST

Patent Literature

[PTL 1] Japanese Unexamined Patent Application Publication No. 7-24868
[PTL 2] PCT Japanese Patent Domestic Re-publication No. 01/015883

SUMMARY OF INVENTION

Technical Problem

As problems at the time of injection molding of a transparent resin molded article,
A. mixing of air bubbles,
B. generation of a weld line (a cold shut) when resins injected from a plurality of gates (injection holes) into a die are adjacent to each other in the die, and
C. generation of a sink mark (a recess) due to a reduction in volume at the time of curing of a resin material can be given.

Both the methods of manufacturing a transparent resin molded article in PTLs 1 and 2 are methods of molding a molded article having a relatively thin thickness in a range of 1 mm to 8 mm and a small size, and therefore, it is difficult for the problems of the above A to C to be generated, and thus it is difficult to become a major problem. However, in the case of a thick and large transparent resin molded article having a thickness of about 20 mm, like a canopy of an aircraft, the above problems A to C become remarkable.

Figure 16:
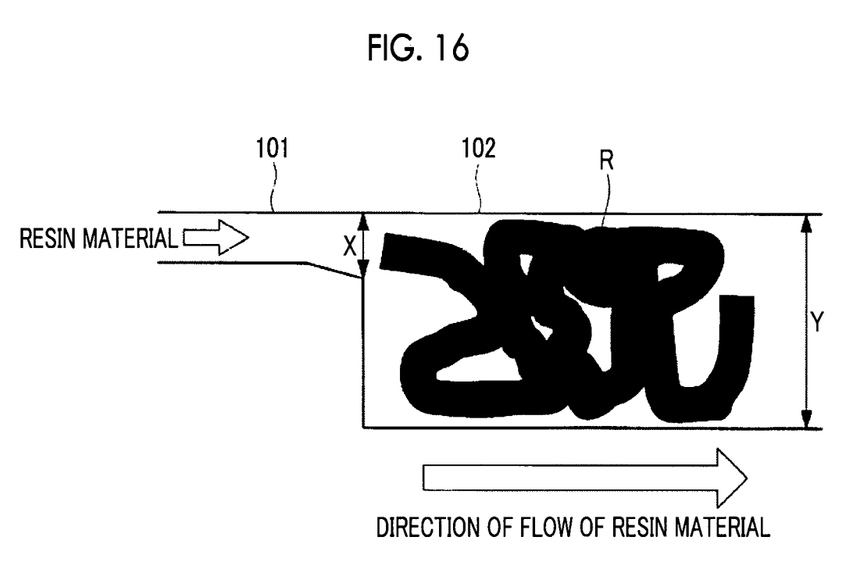
FIG. 16 is a vertical cross-sectional view of an injection molding device showing a problem of the related art.

That is, as shown in FIG. 16, when a resin material R is injected from a gate 101 into a die 102, since a thickness dimension Y of the die 102 is large with respect to a diameter dimension X of the gate 101, the injected resin material R is linearly extruded into the die and then falls as it is and is accumulated in the die, whereby a large amount of air bubbles are mixed therein.

Figure 17:
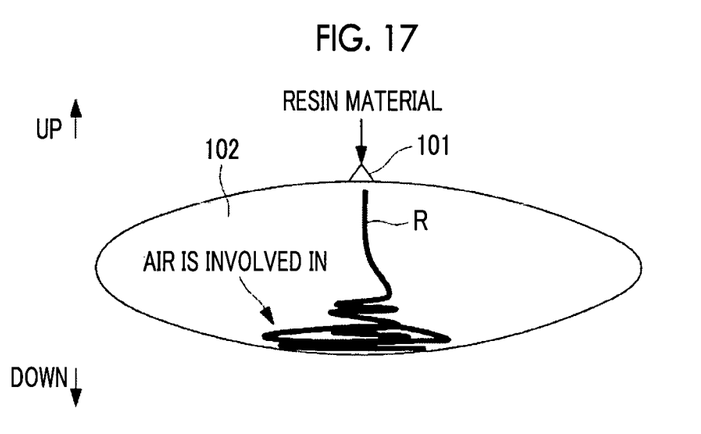
FIG. 17 is a side view of an injection molding device showing a problem of the related art.
Figure 18:
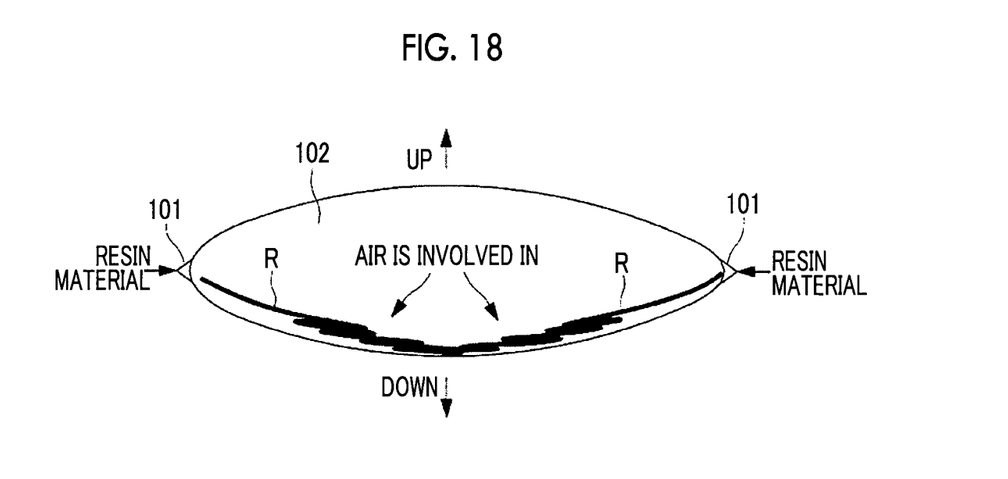
FIG. 18 is a side view of an injection molding device showing a problem of the related art.

Further, in a case where a canopy of an aircraft is molded of resin, in the related art, as shown in FIG. 17, the die 102 is maintained in a posture of lying sideways and the gate 101 is formed at the top portion thereof, and alternatively, as shown in FIG. 18, the gates 101 are formed at both front and rear ends of the die 102 and the resin materials R are injected from the gates 101. However, if the resin material R is injected from such a position into the die 102, since an internal space of the die 102 is wide, the resin material R injected from the gate 101 falls without sticking to an inner wall of the die 102, thereby being linearly extruded and accumulated, similar to the case of FIG. 16, and thus a large amount of air bubbles are mixed therein.

Figure 19:
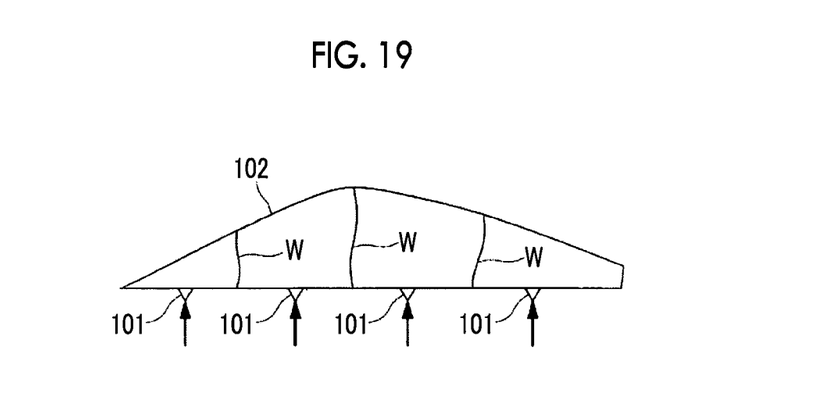
FIG. 19 is a plan view of an injection molding device showing a problem of the related art.

Further, in the die 102 for a canopy having the entire length of 3 m or more, since it is capacitively difficult to inject the resin material R from only a single gate, a plurality of gates 101 (a multi-point gate) are provided and the resin materials R are injected from the gates 101, as shown in FIG. 19. However, if the resin materials R are injected from such a multi-point gate 101, a so-called weld line W is generated in which a boundary surface (a cold shut) at which the resin materials R injected from the respective gates 101 come into contact with each other in the die 102 visually remains. Since the weld line W is accompanied by optical distortion, the weld line W becomes a serious defect in a canopy of an aircraft.

Further, in general, a resin material is reduced in volume at the time of curing, and therefore, a defect called a so-called sink mark in which the surface of a resin molded article becomes concave is easily generated. This becomes remarkable in a thick molded article. The sink mark causes optical distortion in a transparent molded article, and therefore, in the case of a canopy of an aircraft, it is necessary to eliminate the sink marks by polishing the front and the back of a molded article, and this polishing work causes an increase in the manufacturing cost of the molded article.

The present invention has been made in view of such circumstances and has an object to provide an injection molding device and an injection molding method for a transparent resin molded article, in which the generation of a defect such as air bubbles, weld lines, or sink marks is prevented and thus the yield of a transparent resin molded article is improved, whereby it is possible to attain a reduction in manufacturing cost.

Solution to Problem

In order to solve the above problems, the present invention adopts the following means.

That is, an injection molding device for a transparent resin molded article according to a first aspect of the present invention includes: a die for injection-molding the transparent resin molded article; and a gate which is provided at a peripheral edge portion of the die and serves as an inlet through which a resin material is injected into the die, in which a thickness dimension of the die is in a range of 15 mm to 25 mm, and the ratio between a diameter dimension of the gate and the thickness dimension of the die is set in a range of 1:6 to 1:3.

Further, an injection molding method for a transparent resin molded article according to the first aspect of the present invention includes: using a die for injection-molding the transparent resin molded article, and a gate which is provided at a peripheral edge portion of the die and serves as an inlet through which a resin material is injected into the die, in which a thickness dimension of the die is in a range of 15 mm to 25 mm, and the ratio between a diameter dimension of the gate and the thickness dimension of the die is set in a range of 1:6 to 1:3.

According to the injection molding device and the injection molding method described above, the ratio between the diameter dimension of the gate and the thickness dimension of the die is optimized, and therefore, the resin material injected from the gate into the die is prevented from being linearly extruded into and accumulated in the die, and the injected resin material flows in the form of a fountain flow through the inside of the die. For this reason, air bubbles are not mixed in the resin material, and the generation of a defect due to mixing of air bubbles is prevented, and thus the yield of the molded article is improved, whereby it is possible to attain a reduction in manufacturing cost.

Further, an injection molding device for a transparent resin molded article according to a second aspect of the present invention includes: a die for injection-molding a transparent resin molded article having a concave shape; and a gate which serves as an inlet through which a resin material is injected into the die, in which the gate is provided at a peripheral edge portion of the die, an angle of an open face having a concave shape of the die is maintained such that the gate is located at a lower portion of the die, and the resin material is injected upward from a lower portion of the inside of the die by the gate.

Further, an injection molding method for a transparent resin molded article according to the second aspect of the present invention includes: using a die for injection-molding a transparent resin molded article having a concave shape, and a gate which serves as an inlet through which a resin material is injected into the die, in which the die is maintained in a posture in which an open face having a concave shape thereof is substantially vertical, and the gate is provided at a lower portion of a peripheral edge portion of the open face, and thus the resin material is injected upward from a lower portion of the inside of the die by the gate.

According to the injection molding device and the injection molding method described above, the resin material is injected from the gate which is located at the lower portion of the die into the die, and the inside of the die is filled with the resin material toward the upper side. For this reason, the resin material which is injected from the gate into the die is prevented from being linearly extruded and thus falling to and being accumulated on a bottom portion of the die, and thus it is possible to prevent the generation of a defect in which air bubbles are mixed in the molded article.

In the injection molding device having the above configuration, a resin material pool having an inside width greater than a thickness dimension of the die may be provided in parallel along at least a lower edge portion of the open face of the die, the resin material pool and a lower edge portion of the die may be made to continuously communicate with each other along a longitudinal direction, and the gates may be provided at a plurality of locations along a longitudinal direction of the resin material pool.

Similarly, in the injection molding method having the above configuration, a resin material pool having an inside width greater than a thickness dimension of the die may be provided in parallel along at least a lower edge portion of the open face of the die, the resin material pool and a lower edge portion of the die may be made to continuously communicate with each other along a longitudinal direction, the gates may be provided at a plurality of locations along a longitudinal direction of the resin material pool, and the resin materials injected from the plurality of gates into the resin material pool may flow and be mixed with each other in the interior of the resin material pool and be then filled into the die.

According to the injection molding device and the injection molding method described above, the resin material pool having an inside width greater than the thickness dimension of the die is formed at a lower portion of the die, and the resin material is injected from the gates provided in the resin material pool at a plurality of locations. The resin materials injected from the plurality of gates into the resin material pool first flow in the interior of the resin material pool, thereby being mixed with each other. Then, the mixed resin material is widely injected along the lower edge portion of the die from the resin material pool. For this reason, it is possible to prevent the generation of a defect in which the resin materials injected from the plurality of gates (the multi-point gate) form boundary surfaces (weld lines) in the interior of the die.

Further, in the injection molding device and the injection molding method described above, it is preferable that a passage width of a connection passage which connects the lower edge portion of the open face of the die and the inside of the resin material pool is set so as to become larger as an arch length of a concave shape cross-section of the die becomes longer.

According to the injection molding device and the injection molding method described above, when resin is injected from the resin material pool into the die, much resin material is injected at a position where the cross-section arch length of the concave shape of the die is long, and less resin material is injected at a position where the cross-section arch length is short. In this way, a speed at which the resin material is filled from one end to the other end of the concave shape becomes equal over the entire area of the die. For this reason, it is possible to prevent the generation of a defect such as the generation of a boundary surface (a weld line) due to a difference occurring in an arrival speed of the resin material in the interior of the die.

Further, an injection molding device for a transparent resin molded article according to a third aspect of the present invention includes: a die for injection-molding a transparent resin molded article having a concave shape, in which the die is provided with an outer portion molding die which injection-molds an outer portion from an intermediate portion in a sheet-thickness direction to an outer surface of the transparent resin molded article between a first outer mold and a first inner mold, and an inner portion molding die which injection-molds an inner portion from the intermediate portion in the sheet-thickness direction to an inner surface of the transparent resin molded article between a second outer mold and a second inner mold, the first outer mold and the second inner mold can be die-matched, and in a state where the first outer mold with the first inner mold removed therefrom after the injection molding in the outer portion molding die and the second inner mold with the second outer mold removed therefrom after the injection molding in the inner portion molding die are die-matched, an injection space into which a resin material can be injected is formed between the outer portion and the inner portion.

Similarly, an injection molding method for a transparent resin molded article according to the third aspect of the present invention is an injection molding method for injection-molding a transparent resin molded article having a concave shape, including: a primary injection step of injection-molding an outer portion from an intermediate portion in a sheet-thickness direction to an outer surface of the transparent resin molded article between a first outer mold and a first inner mold; a primary curing step of removing the first inner mold with the first outer mold left behind after the injection molding of the outer portion, thereby inducing sink marks in the inner peripheral surface of the outer portion; a secondary injection step of injection-molding an inner portion from the intermediate portion in the sheet-thickness direction to an inner surface of the transparent resin molded article between a second outer mold and a second inner mold; a secondary curing step of removing the second outer mold with the second inner mold left behind after the injection molding of the inner portion, thereby inducing sink marks in the outer peripheral surface of the inner portion; and a tertiary injection step of injecting a resin material into an injection space which is formed between the outer portion and the inner portion by die-matching the first outer mold after the primary curing step and the second inner mold after the secondary curing step.

According to the injection molding device and the injection molding method described above, the outer portion from the intermediate portion in the sheet-thickness direction to the outer surface of the transparent resin molded article having a concave shape is injection-molded by the first outer mold and the first inner mold of the outer portion molding die (the primary injection step). Further, the inner portion from the intermediate portion in the sheet-thickness direction to the inner surface of the transparent resin molded article having a concave shape is injection-molded by the second outer mold and the second inner mold of the inner portion molding die (the secondary injection step).

Then, the first inner mold is removed after the molding of the outer portion, thereby inducing sink marks in the inner peripheral surface of the outer portion (the primary curing step), and the second outer mold is removed after the molding of the inner portion, thereby inducing sink marks in the outer peripheral surface of the inner portion (the secondary curing step). Thereafter, the first outer mold with the outer portion molded thereon and the second inner mold with the inner portion molded thereon are die-matched and a resin material is injected between the outer portion and the inner portion (into the injection space) (the tertiary injection step).

In this manner, after the sink marks are induced in the inner peripheral surface of the outer portion and the outer peripheral surface of the inner portion, a resin material is injected between both the surfaces, whereby it is possible to reliably prevent defects in which sink marks are generated in the front and back surfaces of the transparent resin molded article having a concave shape.

Advantageous Effects of Invention

As described above, according to the injection molding device and the injection molding method for a transparent resin molded article according to the present invention, the generation of a defect such as air bubbles, weld lines, or sink marks is prevented and thus the yield of a transparent resin molded article is improved, whereby it is possible to attain a reduction in manufacturing cost.

BRIEF DESCRIPTION OF DRAWINGS

FIG. 15 shows a fifth embodiment of the present invention, in which FIG. 15(a) is a diagram showing a primary injection step, FIG. 15(b) is a diagram showing a primary curing step, FIG. 15(c) is a diagram showing a secondary injection step, FIG. 15(d) is a diagram showing a secondary curing step, FIG. 15(e) is a diagram showing a tertiary injection step, and FIG. 15(f) is a diagram showing a vertical cross-section of a finished product.

DESCRIPTION OF EMBODIMENTS

Hereinafter, a plurality of embodiments of an injection molding device and an injection molding method for a transparent resin molded article according to the present invention will be described with reference to the drawings.

Figure 1:
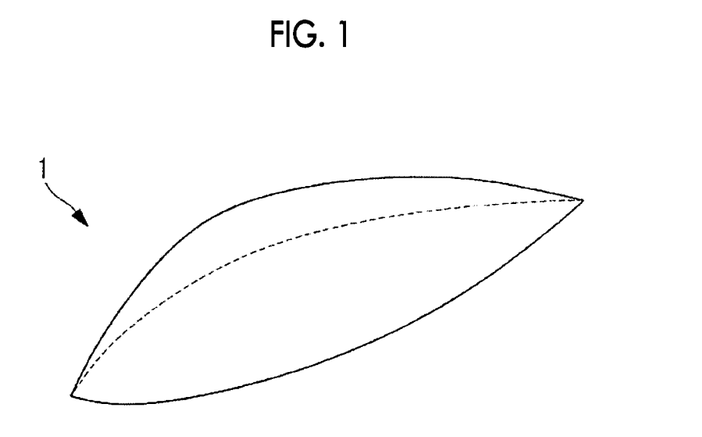
FIG. 1 is a perspective view of a canopy of an aircraft showing an example of a transparent resin molded article.

FIG. 1 is a perspective view of a canopy of an aircraft showing an example of a transparent resin molded article. A canopy 1 is a large-sized resin molded article which has a concave shape (a bowl shape) that is elongated along a front-back direction and is concave upward, and in which the entire length thereof is, for example, 3 m or more. The canopy 1 is integrally injection-molded of a transparent resin material such as acryl or polycarbonate, and the thickness thereof is set in a range of 15 mm to 25 mm.

[First Embodiment]

Figure 2:
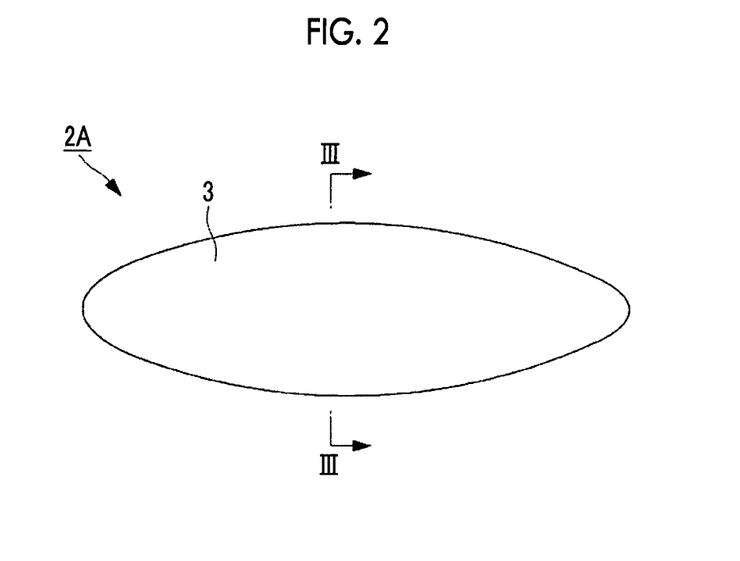
FIG. 2 is a side view of an injection molding device (a die) for the canopy.
Figure 3:
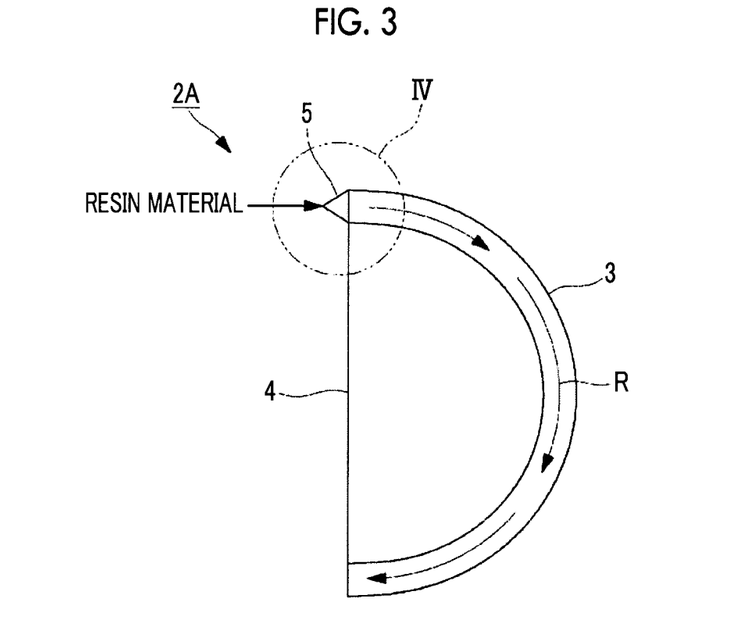
FIG. 3 is a vertical cross-sectional view of the injection molding device along line III-III of FIG. 2.

FIG. 2 is a side view of an injection molding device 2A (a die 3) for the canopy 1 according to a first embodiment of the present invention, and FIG. 3 is a vertical cross-sectional view along line III-III of FIG. 2. In addition, these drawings conceptually show only an internal space of the die 3. The die 3 is maintained in a posture of lying sideways in which an open face 4 (refer to FIG. 3) of the concave shape thereof is substantially vertical.

The injection molding device 2A is provided with the die 3, and a gate 5 serving as an inlet through which a resin material is injected into the die 3. The gate 5 is provided at one location in the top portion of a peripheral edge portion of the die 3, for example. The inside of the die 3 is filled with a resin material injected from the gate 5, and the resin material is cured, whereby the canopy 1 is molded.

Figure 4:
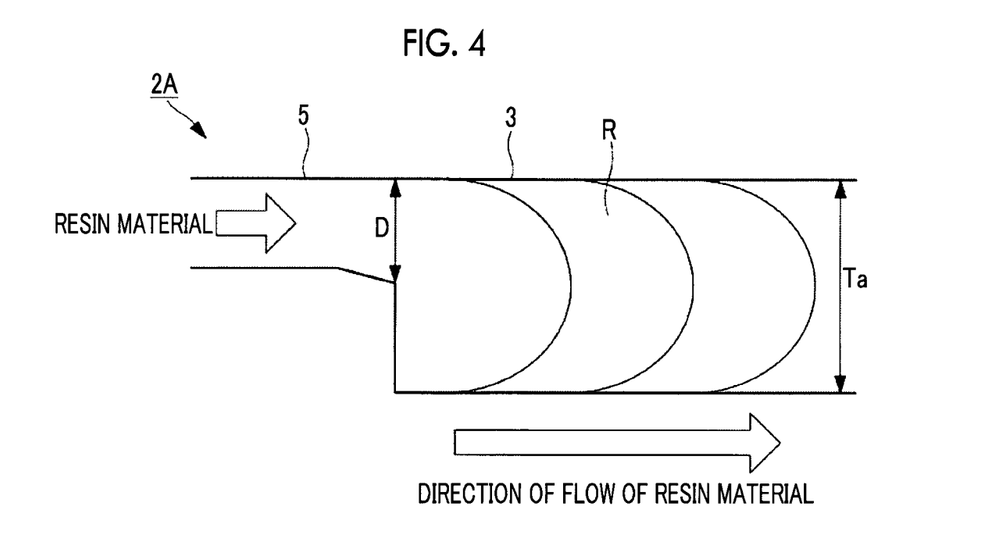
FIG. 4 is an enlarged vertical cross-sectional view of a portion IV of FIG. 3, showing a first embodiment of the present invention.

FIG. 4 is an enlarged vertical cross-sectional view of a portion IV of FIG. 3, showing a connection portion between the die 3 and the gate 5. As described above, a thickness dimension Ta of the die 3 is set in a range of 15 mm to 25 mm. On the other hand, it is preferable that a diameter dimension D of the gate 5 is set such that the ratio between the diameter dimension D and the thickness dimension Ta is in a range of 1:6 to 1:3. For example, in a case where the thickness dimension Ta is 20 mm, it is preferable that the diameter dimension D is set to be in a range of 3.3 mm to 6.7 mm.

In an experiment by the inventors, it was confirmed that when the ratio between the diameter dimension D of the gate 5 and the thickness dimension Ta of the die 3 is 1:3, the ratio between D and Ta is optimized and thus the best injection molding is performed. That is, a resin material injected from the gate 5 into the die 3 is prevented from being linearly extruded and then falling to and being accumulated on a bottom portion of the die 3, as in the related art shown in FIG. 16, and flows in the form of a fountain flow through the inside of the die 3, whereby air bubbles are not mixed in the resin material. However, if the ratio between D and Ta is greater than the ratio of 1:3, the fluidity of a resin material is lowered, and thus there is d concern that defective filling of the die 3 with the resin material may occur.

As described above, according to the injection molding device 2A and the injection molding method, the ratio between the diameter dimension D of the gate 5 and the thickness dimension Ta of the die 3 is set in a range of 1:6 to 1:3, whereby the generation of a defect due to mixing of air bubbles is prevented, and thus the yield of the canopy 1 which is a molded article is improved, whereby it is possible to attain a reduction in manufacturing cost.

[Second Embodiment]

Figure 5:
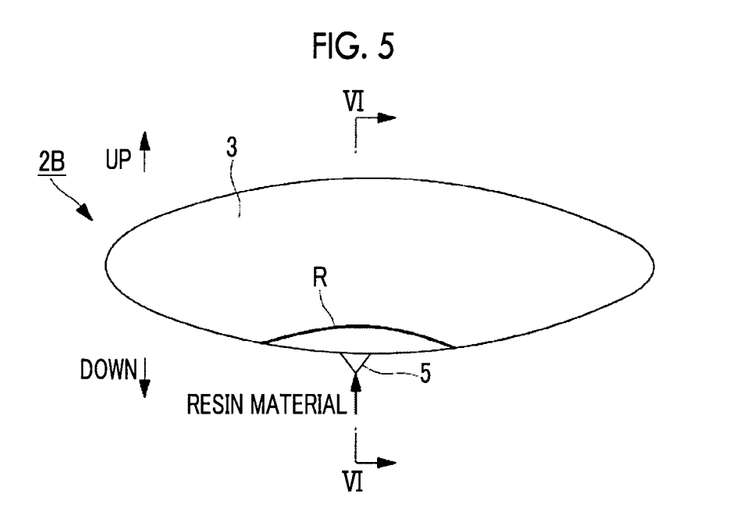
FIG. 5 is a side view of an injection molding device showing a second embodiment of the present invention.
Figure 6:
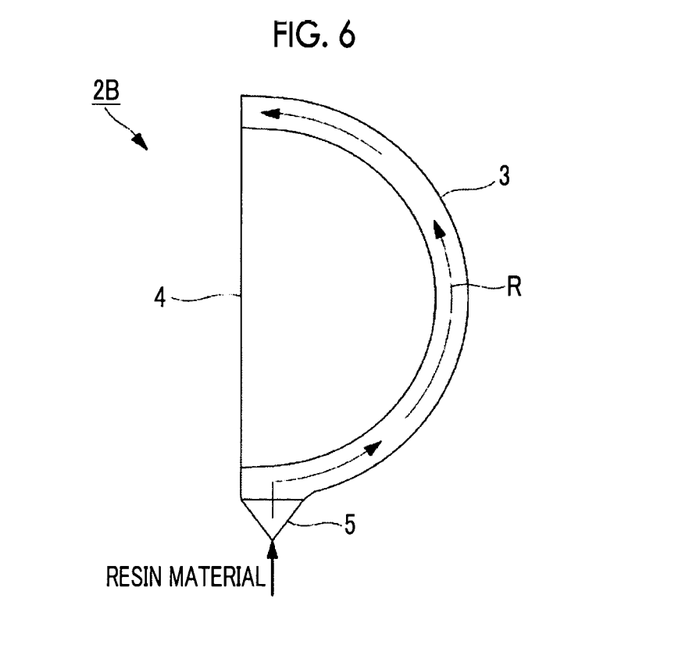
FIG. 6 is a vertical cross-sectional view of the injection molding device along line VI-VI of FIG. 5.

FIG. 5 is a side view of an injection molding device 2B (the die 3) showing a second embodiment of the present invention, and FIG. 6 is a vertical cross-sectional view along line VI-VI of FIG. 5. Also in the injection molding device 2B, the die 3 is maintained in a posture of lying sideways in which the open face 4 (refer to FIG. 6) of the concave shape thereof is substantially vertical.

The gate 5 through which a resin material is injected into the die 3 is provided at one location in the lowest portion of the peripheral edge portion of the die 3. A resin material R is injected upward from the lowest portion of the inside of the die 3 by the gate 5.

According to the injection molding device 2B, the resin material R is injected from the gate 5 which is located at the lowest portion of the die 3 into the die 3, and thus the inside of the die 3 is filled with the resin material R toward the upper side from the lowest portion. For this reason, the resin material R injected from the gate 5 into the die 3 is prevented from being linearly extruded and then falling as it is and being accumulated on the bottom portion of the die 3, as in the related art shown in FIGS. 17 and 18. Therefore, it is possible to prevent a defect in which air bubbles are mixed in a molded article.

In addition, the open face 4 of the die 3 does not necessarily need to be strictly vertical and it is favorable if it has an angle at which the gate 5 is located at the lowest portion of the die 3 and the inside of the die 3 is filled with the resin material R injected from here, sequentially from the lower side without dropping of the resin material R in the interior of the die 3.

[Third Embodiment]

Figure 7:
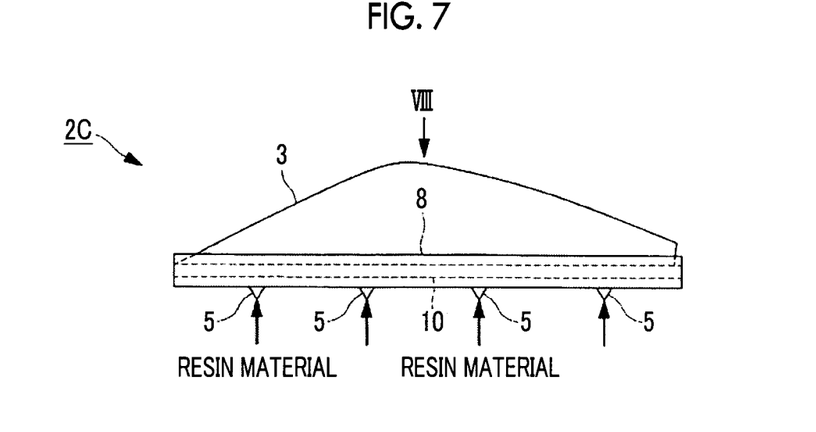
FIG. 7 is a plan view of an injection molding device showing a third embodiment of the present invention.
Figure 8:
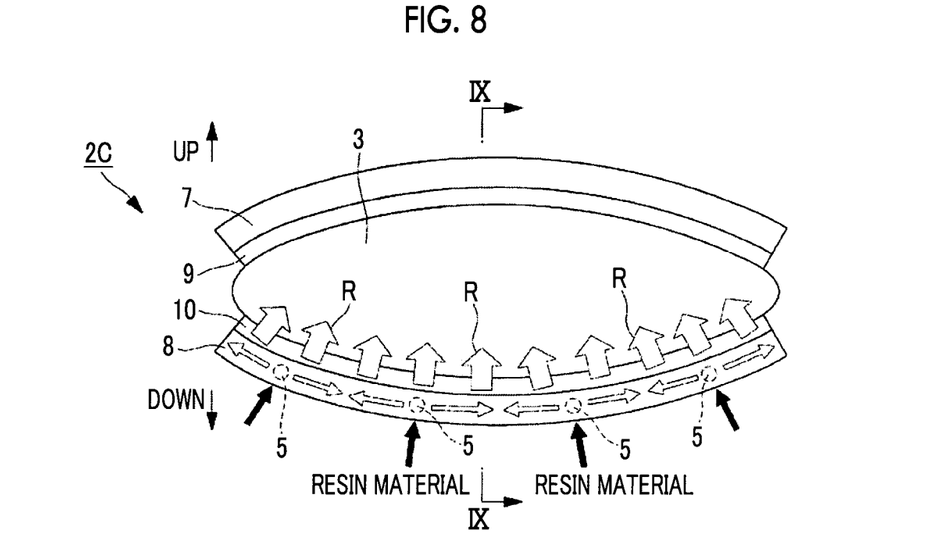
FIG. 8 is a side view of the injection molding device as viewed from an arrow VIII of FIG. 7.
Figure 9:
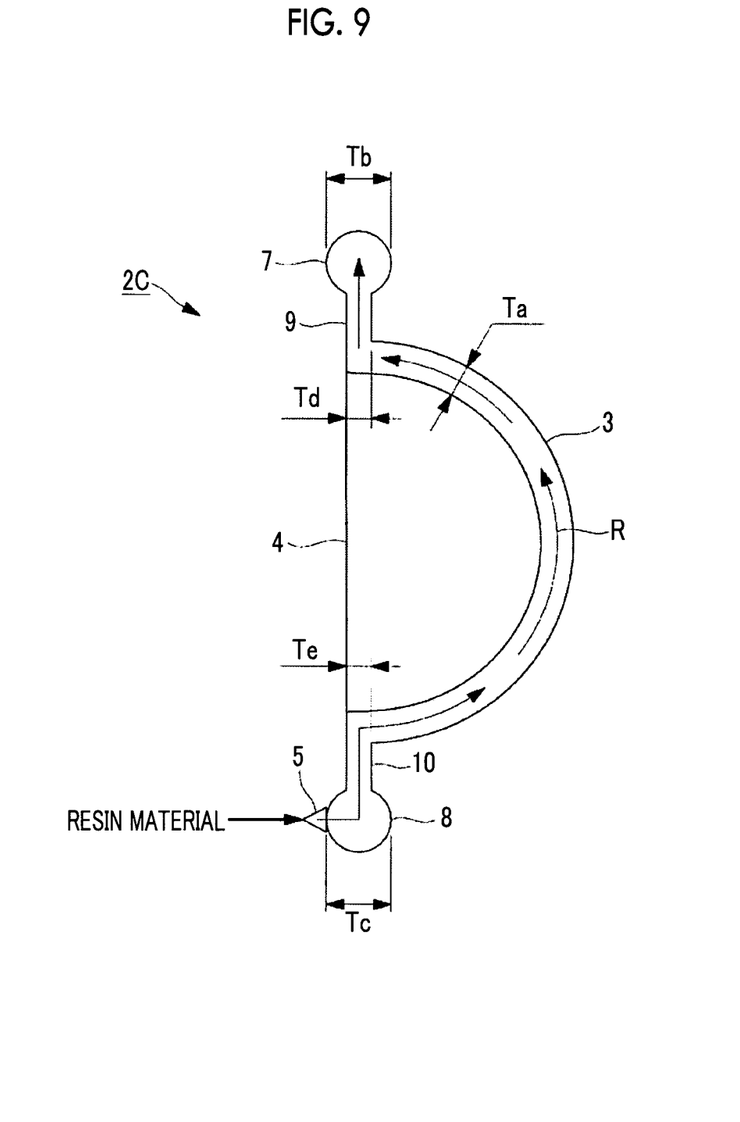
FIG. 9 is a vertical cross-sectional view of the injection molding device along line IX-IX of FIG. 8.

FIG. 7 is a plan view of an injection molding device 2C (the die 3) showing a third embodiment of the present invention, FIG. 8 is a side view as viewed from an arrow VIII of FIG. 7, and FIG. 9 is a vertical cross-sectional view along line IX-IX of FIG. 8. Also in the injection molding device 2C, the die 3 is maintained in a posture of lying sideways in which the open face 4 (refer to FIG. 9) of the concave shape thereof is substantially vertical. However, the open face 4 may not necessarily be substantially vertical and it is favorable if it has an angle at which the gate 5 described below is located at the lowest portion of the die 3.

In the injection molding device 2C, resin material pools 7 and 8 are provided in parallel along edge portions on both the upper and lower sides of the die 3. The resin material pools 7 and 8 respectively have inside widths Tb and Tc greater than the thickness dimension Ta of the die 3, as shown in FIG. 9. Further, the respective resin material pools 7 and 8 are curved to match the shape of an outer periphery of the die 3. However, the resin material pools 7 and 8 may be formed linearly.

The upper and lower resin material pools 7 and 8 and the edge portions on both the upper and lower sides of the die 3 are respectively connected with connection passages 9 and 10. As shown in FIG. 9, the sizes of passage widths Td and Te of the respective connection passages 9 and 10 are made to be smaller than the inside widths Tb and Tc of the resin material pools 7 and 8. Further, it is preferable that the ratio between each of the passage widths Td and Te of the connection passages 9 and 10 and the thickness dimension Ta of the die 3 is set in a range of 1:6 to 1:3, like the ratio between the diameter dimension D of the gate 5 and the thickness dimension Ta of the die 3 in the injection molding device 2A of the first embodiment. For example, in a case where the thickness dimension Ta of the die 3 is 20 mm, the passage widths Td and Te is set to be in a range of 3.3 mm to 6.7 mm.

The edge portions on both the upper and lower sides of the die 3 and the insides of the resin material pools 7 and 8 are continuously connected along a longitudinal direction by the connection passages 9 and 10. In other words, the connection passages 9 and 10 are narrow slit-shaped passages which connect the edge portions of the die 3 and the resin material pools 7 and 8. Then, a plurality of (for example, four) gates 5 are provided at the resin material pool 8 on the lower side along a longitudinal direction thereof.

Figure 10:
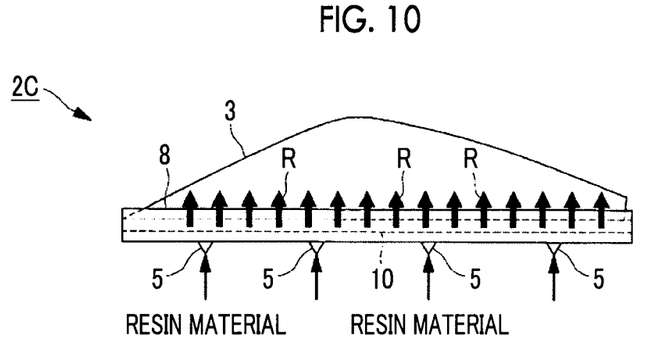
FIG. 10 is a plan view of the injection molding device showing an operation of the third embodiment.

In the injection molding device 2C configured in this manner, the resin materials R injected from the plurality of gates 5 into the resin material pool 8 first join each other and flow together in the interior of the resin material pool 8, thereby being mixed with each other, as shown in FIG. 8. Then, as shown in FIG. 10 too, the mixed resin material R passes through the narrow slit-shaped connection passage 10, thereby being extruded in a plane shape and thus being widely injected simultaneously along the lower edge portion of the die 3. A surplus of the resin material R having spread in the interior of the die 3 flows out into the resin material pool 7 through the connection passage 9.

In this manner, the resin materials R injected from the plurality of gates 5 (a multi-point gate) temporarily join each other in the interior of the resin material pool 8, then form a plane shape through the slit-shaped connection passage 10, and are filled into the die 3 from the lower edge portion thereof, and therefore, the resin materials R do not form a boundary surface (a weld line) in the interior of the die 3. Therefore, it is possible to effectively prevent a defect in which a weld line is generated in a molded article.

[Fourth Embodiment]

Figure 11:
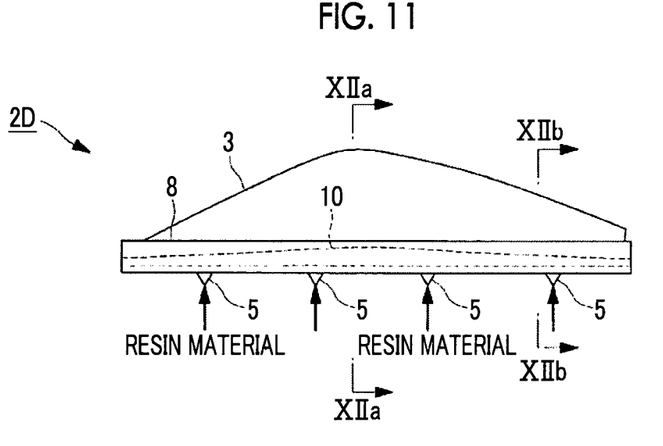
FIG. 11 is a plan view of an injection molding device showing a fourth embodiment of the present invention.
Figure 12A:
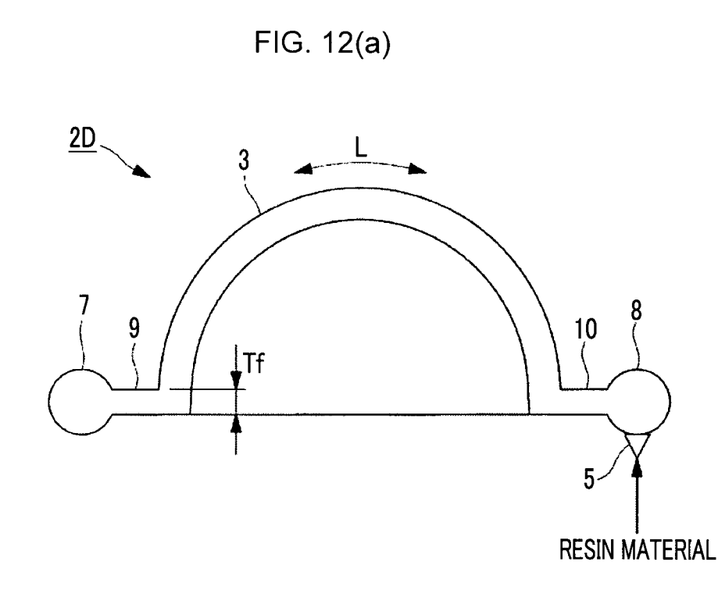
FIGS. 12(a) and 12(b) respectively are vertical cross-sectional views of the injection molding device along line XIIa-XIIa and line XIIb-XII-b of FIG. 11.
Figure 12B:
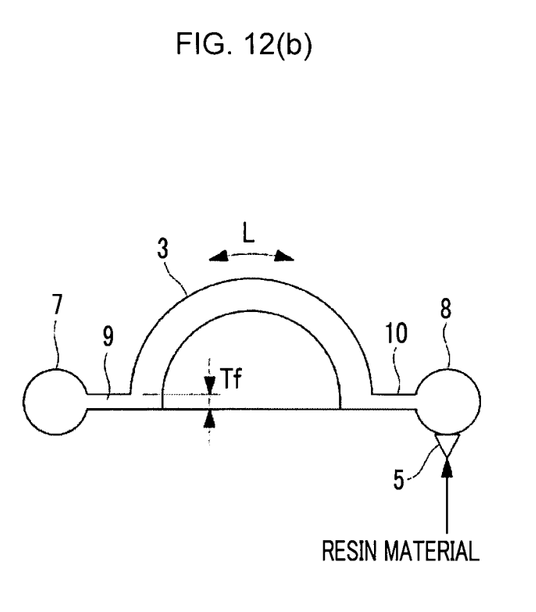

FIG. 11 is a plan view of an injection molding device 2D (the die 3) showing a fourth embodiment of the present invention, and FIGS. 12(a) and 12(b) respectively are vertical cross-sectional views along line XIIa-XIIa and line XIIb-XII-b of FIG. 11. The injection molding device 2D has approximately the same configuration as that of the injection molding device 2C of the third embodiment. However, a passage width Tf of each of the connection passages 9 and 10 is set so as to become larger as an arch length L of a concave shape cross-section (refer to FIG. 12) of the die 3 becomes longer. That is, each of the connection passages 9 and 10 is made to be a tapered slit in which the passage width Tf is large at an intermediate portion in the front-back direction of the die 3 and the passage width Tf becomes smaller as it goes toward both end portions in the front-back direction.

In the injection molding device 2D, the resin materials R injected from the plurality of gates 5 into the resin material pool 8 join each other in the interior of the resin material pool 8 and are then injected into the die 3 through the connection passage 10, similar to the injection molding device 2C of the third embodiment.

Figure 13A:
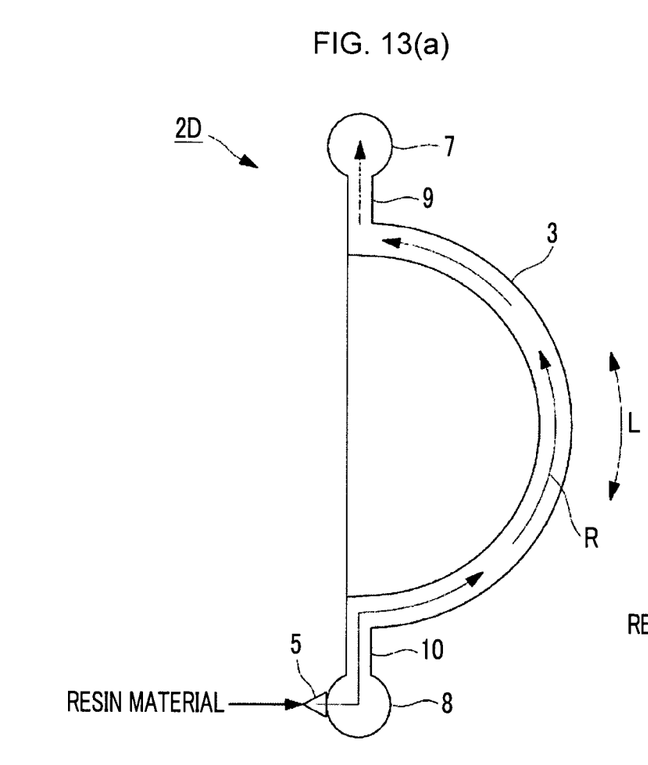
FIGS. 13(a) and 13(b) respectively are vertical cross-sectional views of the injection molding device showing an operation of the fourth embodiment.
Figure 13B:
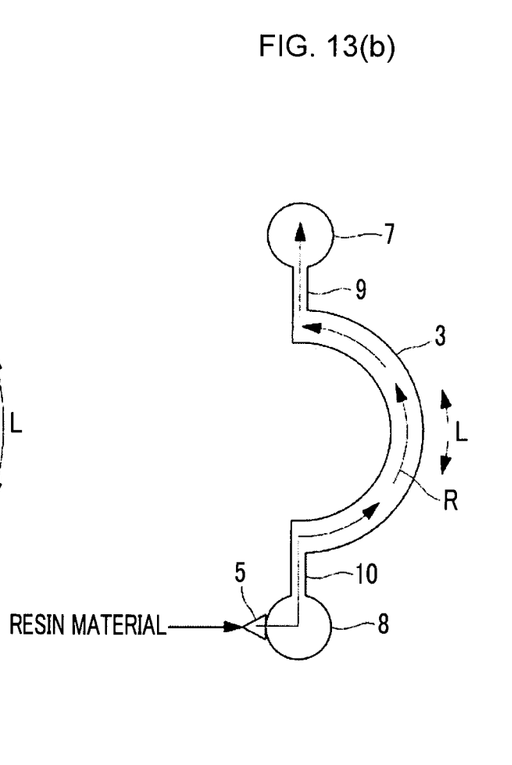
Figure 14:
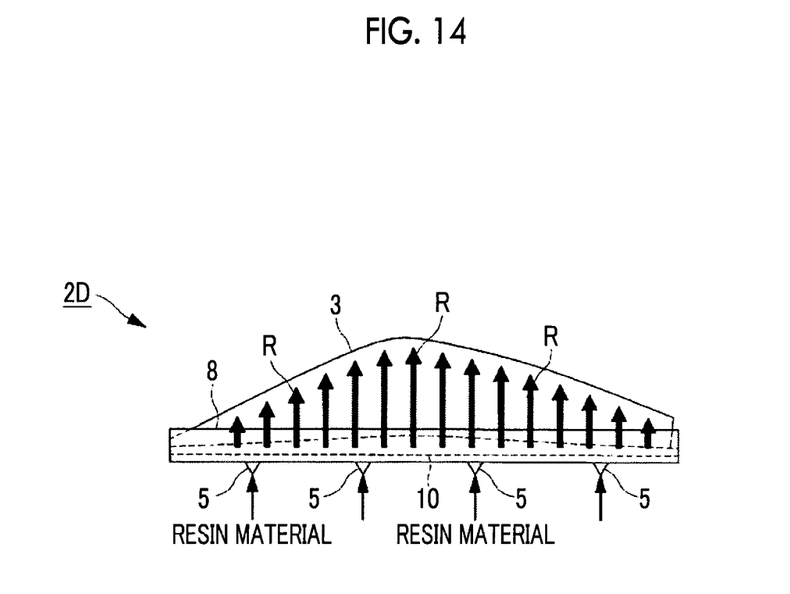
FIG. 14 is a plan view of the injection molding device showing an operation of the fourth embodiment.

At this time, as shown in FIGS. 13 and 14, at a position (the vicinity of a central portion in the longitudinal direction) where the cross-section arch length L of the concave shape of the die 3 is long, the injection amount of the resin material R is increased, and at a position (the vicinity of the both end portions in the longitudinal direction) where the cross-section arch length L is short, the injection amount of the resin material R is reduced.

In this way, a speed at which the resin material R is filled from one end to the other end having the concave shape of the die 3 becomes equal over the entire length in the longitudinal direction of the die 3. For this reason, it is possible to prevent the generation of a boundary surface (a weld line) due to a difference occurring in an arrival speed of the resin material R in the interior of the die 3.

[Fifth Embodiment]

FIGS. 15(a) to 15(f) are vertical cross-sectional views of an injection molding device 2E showing a fifth embodiment of the present invention. The injection molding device 2E is provided with a die 13 for injection-molding a transparent resin molded article having a concave shape, such as the canopy 1 (refer to FIG. 15(f)) described above.

Figure 15:
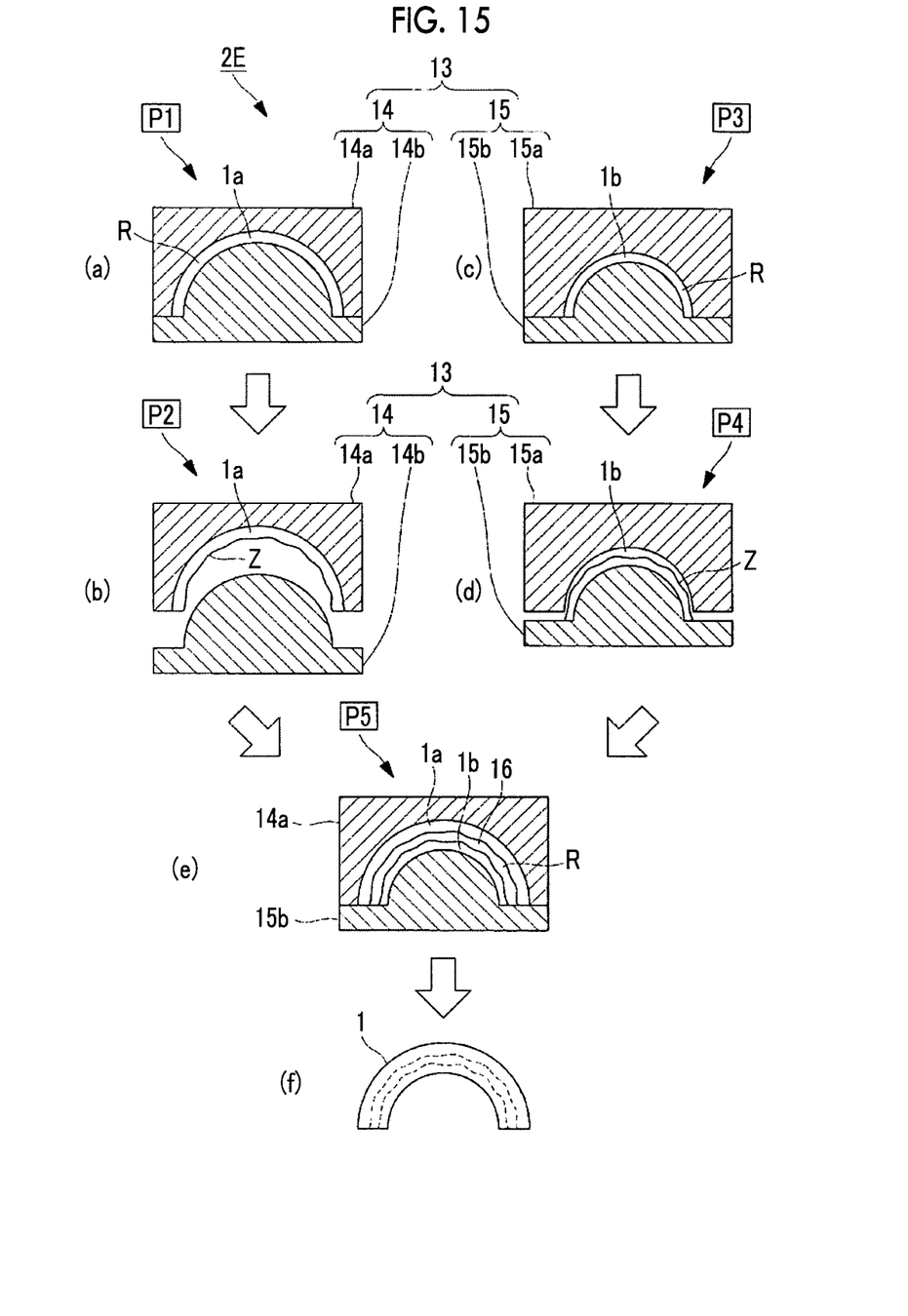

The die 13 is provided with an outer portion molding die 14 and an inner portion molding die 15. The outer portion molding die 14 is a die for injection-molding an outer portion 1a from an intermediate portion in a sheet-thickness direction to the outer surface of the canopy 1, and the inner portion molding die 15 is a die for injection-molding an inner portion 1b from the intermediate portion in the sheet-thickness direction to the inner surface of the canopy 1.

The outer portion molding die 14 is provided with a first outer mold 14a and a first inner mold 14b, and the inner portion molding die 15 is provided with a second outer mold 15a and a second inner mold 15b. Then, the first outer mold 14a and the second inner mold 15b can be die-matched (refer to FIG. 15(e)).

The procedure for injection-molding the canopy 1 by the injection molding device 2E is as follows.

First, as shown in FIG. 15(a), the outer portion 1a of the canopy 1 is injection-molded by injecting the resin material R between the first outer mold 14a and the first inner mold 14b of the outer portion molding die 14 (a primary injection step P1).

Next, as shown in FIG. 15(b), the first inner mold 14b is removed, leaving behind the first outer mold 14a, thereby inducing sink marks Z (recesses) in the inner peripheral surface of the outer portion 1a (a primary curing step P2). That is, since the outer peripheral surface of the injection-molded outer portion 1a is in contact with the first outer mold 14a, the outer peripheral surface is rapidly cooled, and thus sink marks are not generated. However, since the inner peripheral surface of the outer portion 1a is kept warm by air by removing the first inner mold 14b and cooling is delayed, the sink marks Z are generated.

Further, along with the injection molding of the outer portion 1a described above, as shown in FIG. 15(c), the inner portion 1b of the canopy 1 is injection-molded by injecting the resin material R between the second outer mold 15a and the second inner mold 15b of the inner portion molding die 15 (a secondary injection step P3).

Next, as shown in FIG. 15(d), the second outer mold 15a is removed, leaving behind the second inner mold 15b, thereby inducing the sink marks Z (recesses) in the outer peripheral surface of the inner portion 1b (a secondary curing step P4). That is, since the inner peripheral surface of the injection-molded inner portion 1b is in contact with the second inner mold 15b, the inner peripheral surface is rapidly cooled, and thus sink marks are not generated. However, since the outer peripheral surface of the inner portion 1b is kept warm by air by removing the second outer mold 15a and cooling is delayed, the sink marks Z are generated.

Next, as shown in FIG. 15(e), the first outer mold 14a with the first inner mold 14b removed therefrom and the second inner mold 15b with the second outer mold 15a removed therefrom are die-matched. At this time, an injection space 16 is formed between the outer portion 1a and the inner portion 1b. Then, the resin material R is injected into the injection space 16 (a tertiary injection step P5), and thus the canopy 1 is completed (refer to FIG. 15(f)).

According to the injection molding device 2E and the injection molding method, by inducing the sink marks Z in the inner peripheral surface of the outer portion 1a and the outer peripheral surface of the inner portion 1b and then injecting the resin material R between both the surfaces, it is possible to reliably prevent a defect in which sink marks are generated in the front and back surfaces of the canopy 1. Therefore, it is possible to omit a polishing step of eliminating sink marks after the molding of the canopy 1, which has been regarded as being necessary in the past, and accordingly, it is possible to contribute to a significant reduction in manufacturing cost and significant quality improvement.

In addition, the qualities of material of the resin materials R which are injected in the first injection step to the tertiary injection step may not necessarily be the same quality of material. By varying the qualities of material, the properties, or the like of the resin materials R which are injected in the respective injection steps P1, P3, and P5, it is possible to arbitrarily set the strength characteristic of the canopy 1, performance to suppress optical distortion, or the like.

As described above, according to the injection molding devices 2A to 2E and the injection molding methods for the transparent resin molded article according to the present invention, the generation of defects such as air bubbles, weld lines, or sink marks is prevented, and thus the yield of the transparent resin molded article is improved, whereby it is possible to attain a reduction in manufacturing cost.

In addition, the present invention is not limited to only the configurations of the first to fifth embodiments described above, and it is possible to appropriately add modifications or improvements thereto within a scope which does not depart from the gist of the present invention, and embodiments with modifications or improvements added thereto in this manner shall also be included in the scope of the present invention.

REFERENCE SIGNS LIST

1: canopy (transparent resin molded article having concave shape)
1a: outer portion
1b: inner portion
2A, 2B, 2C, 2D, 2E: injection molding device
3, 13: die
4: open face
5: gate
7, 8: resin material pool
9, 10: connection passage
14: outer portion molding die
14a: first outer mold
14b: first inner mold
15: inner portion molding die
15a: second outer mold
15b: second inner mold
16: injection space
D: diameter dimension of gate
L: cross-section arch length of concave shape of die
P1: primary injection step
P2: primary curing step
P3: secondary injection step
P4: secondary curing step
P5: tertiary injection step
R: resin material
Ta: thickness dimension of die
Tb, Tc: inside width of resin material pool
Td, Te, Tf: passage width of connection passage

The invention claimed is:

1. An injection molding device for a transparent resin molded article, the injection molding device comprising:
a die having a concave shape for injection-molding the transparent resin molded article;
a resin material pool which is provided in parallel at a peripheral edge portion of the die, resin materials flowing and joining each other in an interior of the resin material pool;
a plurality of gates which are provided at a plurality of locations along a longitudinal direction of the resin material pool and inject the resin materials into the resin material pool; and
a connection passage in which the interior of the resin material pool and a lower edge portion of the die are made to continuously communicate with each other along a longitudinal direction,
wherein:
a thickness dimension of the die is in a range of 15 mm to 25 mm, and the ratio between a passage width of the connection passage and the thickness dimension of the die is set in a range of 1:6 to 1:3,
an angle of an open face of the die having the concave shape is maintained such that the plurality of gates are located at a lower portion of the die,
the resin materials injected from the plurality of gates join each other in the interior of the resin material pool, and
the resin materials joining in the interior of the resin material pool are simultaneously injected upward from a lower portion of the inside of the die along the peripheral edge portion of the die through the connection passage.

2. The injection molding device according to claim 1, wherein the resin material pool has an inside width which is greater than the thickness dimension of the die.

3. The injection molding device according to claim 2, wherein the passage width of the connection passage becomes larger as an arch length of a concave shape cross section of the die becomes longer.

* * * * *